US008393302B1

(12) United States Patent
Blakemore

(10) Patent No.: US 8,393,302 B1
(45) Date of Patent: Mar. 12, 2013

(54) WALKER, MAN'S OTHER BEST FRIEND

(76) Inventor: Sean Blakemore, Burbank, CA (US)

( * ) Notice: Subject to any disclaimer, the term of this patent is extended or adjusted under 35 U.S.C. 154(b) by 0 days.

(21) Appl. No.: 12/927,739

(22) Filed: Nov. 23, 2010

Related U.S. Application Data

(60) Provisional application No. 61/398,434, filed on Jun. 25, 2010.

(51) Int. Cl.
*A01K 27/00* (2006.01)

(52) U.S. Cl. .................. 119/796; 119/797; 119/798

(58) Field of Classification Search .......... 119/795–799
See application file for complete search history.

(56) References Cited

U.S. PATENT DOCUMENTS

| | | | | |
|---|---|---|---|---|
| 5,762,029 A * | 6/1998 | DuBois et al. | | 119/796 |
| 5,901,668 A * | 5/1999 | Goodger, Sr. | | 119/795 |
| 6,024,054 A * | 2/2000 | Matt et al. | | 119/796 |
| 6,792,893 B1 * | 9/2004 | Quintero et al. | | 119/796 |
| 7,207,296 B2 * | 4/2007 | DiDonato | | 119/796 |
| 7,455,034 B2 * | 11/2008 | DiDonato | | 119/796 |
| 7,559,292 B2 * | 7/2009 | Blandford | | 119/796 |
| 7,980,202 B2 * | 7/2011 | Bentz et al. | | 119/796 |
| 2007/0215065 A1 * | 9/2007 | Furlich | | 119/795 |
| 2009/0120376 A1 * | 5/2009 | Foster | | 119/795 |

FOREIGN PATENT DOCUMENTS

| | | | |
|---|---|---|---|
| DE | 102007010294 | * | 10/2007 |
| EP | 2095708 | * | 9/2009 |
| JP | 2009-28023 | * | 2/2009 |
| WO | WO 97/25858 | * | 7/1997 |
| WO | WO 2006/039816 | * | 4/2006 |

* cited by examiner

*Primary Examiner* — David Parsley
(74) *Attorney, Agent, or Firm* — Ruth Eure

(57) ABSTRACT

The present invention provides a retractable leash system which provides for walking one, two three or four pets with a single, handheld unit. In overall appearance, the device is a single unit composed of two roughly symmetrical halves, configured in an hourglass shape and formed in a tough and durable, injection-molded thermoplastic. The upper component is surmounted with an arcuate, ergonomically contoured and textured rubber handgrip or handle, and features a sliding control release and locking lever to be manipulated by the thumb to allow the leash or leashes to be unreeled or locked in place. A separate control-button operates a battery-powered light-emitting diode light, this light placed below the upper arc of the handle and oriented to shine toward the ground. The light provides either continual illumination or repeated flashing illumination, depending on the sequence with which the user presses the control button.

7 Claims, 27 Drawing Sheets

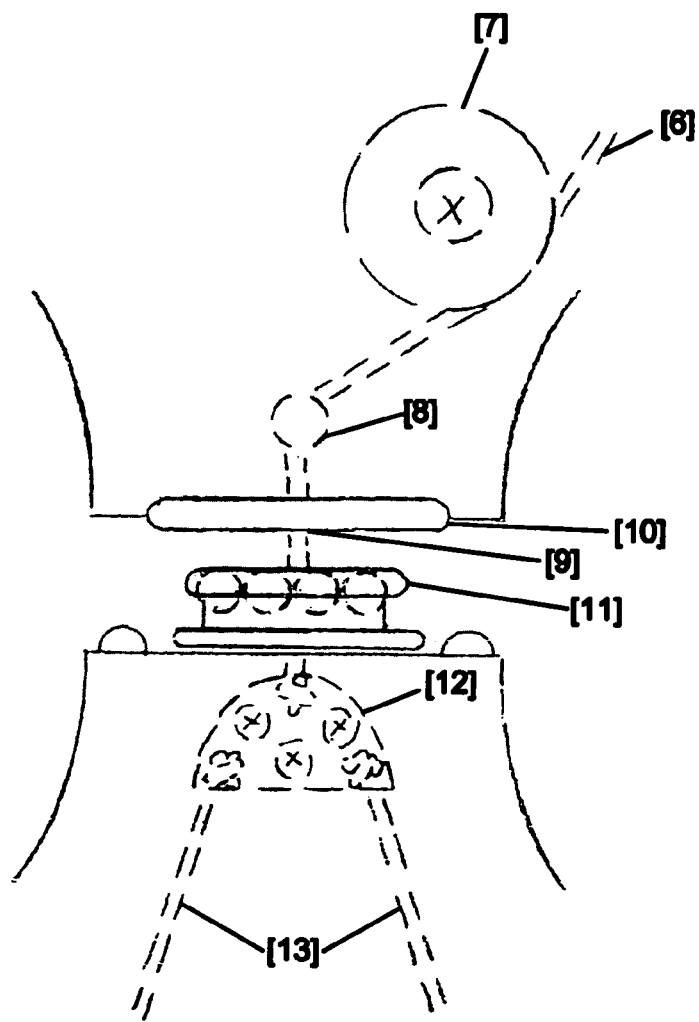

[14]

WALKER, MAN'S OTHER BEST FRIEND

CLAIM OF PRIORITY

This patent application claims priority under 35 USC 119 (e) (1) from U.S. Provisional Patent Application Ser. No. 61/398,434 filed Jun. 25, 2010, of common inventorship herewith entitled, "The Walker."

FIELD OF THE INVENTION

The present invention pertains to the field of animal restraint devices, and more specifically to the field of multiple pet leash devices.

BACKGROUND OF THE INVENTION

The prior art has put forth several designs for multiple pet leash devices. Among these are:

U.S. Pat. No. 5,901,668 to Kermit E. Goodger, Sr. describes a leash having a swiveling connective portion for restraint of multiple animals on the same leash. The swiveling clamp is a connective portion to connect the main line, held by the animal handler to each of the sub lines that in turn connect to the collar of each animal. Each of the sub-lines is connected to the clamp by a clip or some other arrangement that allows each of the connections to move somewhat along the base of the triangular clamp and so spread themselves apart from another as the animals move.

U.S. Pat. No. 6,792,893 to Diane Ellen Quintero and Omar Alberto Quintero-Carmona describes a retractable leash for two animals which includes two spool assemblies for individual extension and retraction of each animal's cord. Each animal's cord is controlled by a button and locking mechanism.

U.S. Pat. No. 7,455,034 to Pietro DiDonato describes a two-pet no-tangle retractable leash device including an axle having a rod opening and a first spool including a first leash and a second spool including a second leash rotatably mounted on the axle.

None of these prior art references describe the present invention.

SUMMARY OF THE INVENTION

It is an object of the present invention to provide an improved pet walking device.

It is a further object of the present invention to provide an improved pet walking device for multiple pets.

It is a still further object of the present invention to provide a modified embodiment of a pet walking device.

BRIEF DESCRIPTION OF THE DRAWINGS

FIG. 7A is a cut away view of the upper segment of the lower portion and the lower segment of the upper portion showing internal elements of the swivel mechanism of the pet walking device of the present invention.

DETAILED DESCRIPTION OF THE INVENTION

Retractable dog leashes have become extremely popular in recent years, and are widely available in different strengths and lengths for various breeds. Basically, a retractable leash consists of a handle, within which is a spring-loaded reel on which the leash is wound. By releasing or locking a thumb-button, the walker can control the length of the leash, allowing the dog to range farther, or keeping the dog at a specific distance. The pet superstore, PetSmart, offers 16 retractable leashes on its website, indicating the popularity of these devices but in perusing them, one notices a single characteristic they all share, and a single shortcoming, all are designed with a single leash, and none are intended for walking more than one dog. In order to walk two dogs, the owner must fall back upon traditional leashes and, unless one keeps both dogs on a very short leash, the dogs and their leashes will get tangled.

Figure 1A:
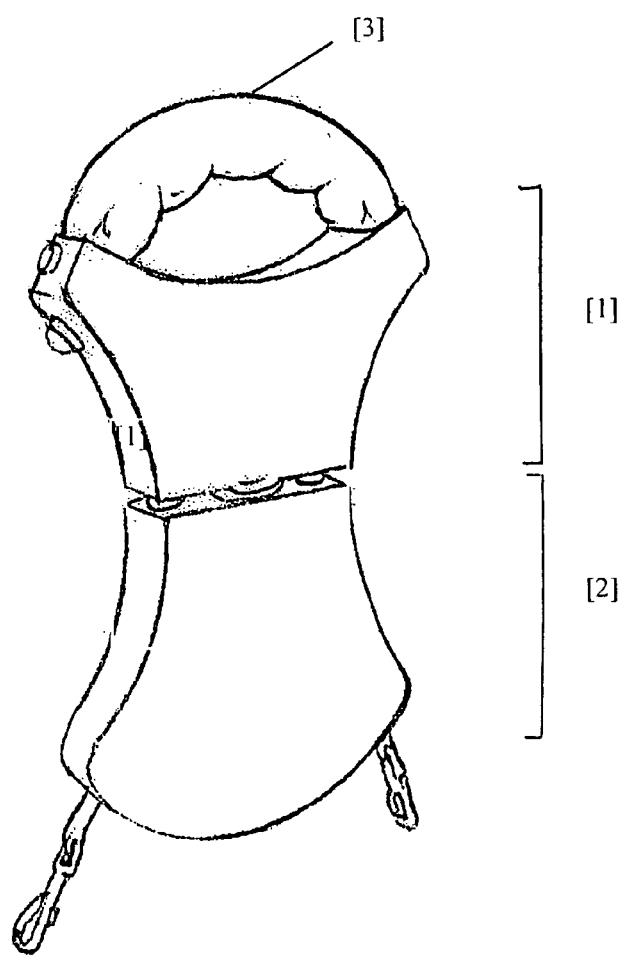
FIG. 1A is an elevational angled perspective view of the device of the present invention.
Figure 1B:
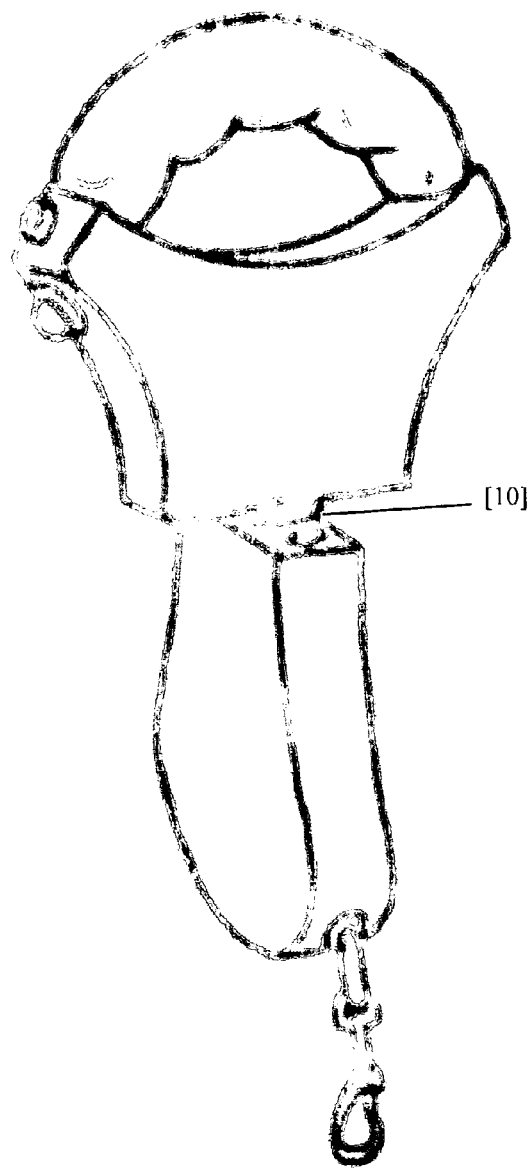
FIG. 1B is an elevational angled perspective view of the device of the present invention showing the distal portion rotated ninety-degrees from the handle portion.
Figure 7B:
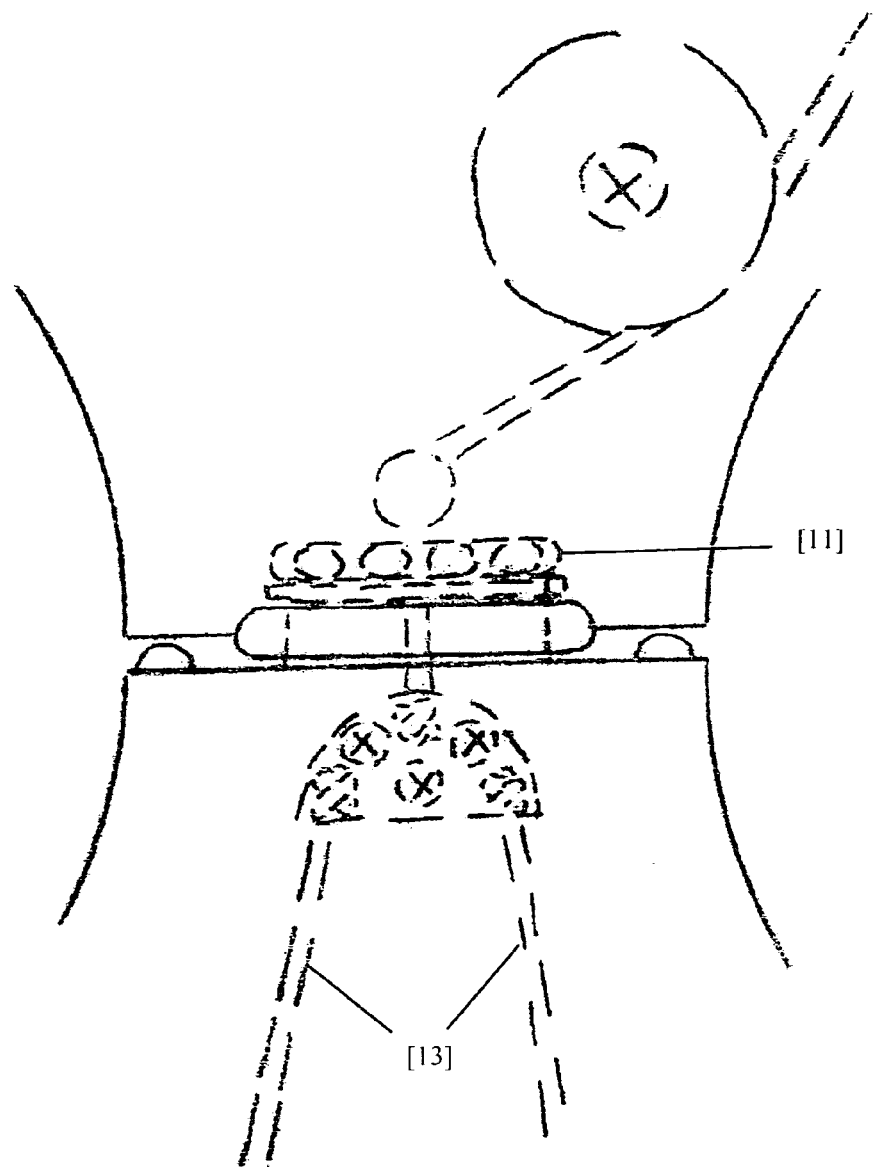
FIG. 7B is a front cutaway view of the upper segment of the lower portion and the lower segment of the upper portion of the modified version of the pet walking device of the present invention showing the mechanism of the heavy duty swivel device.

The present invention, hereinafter referred as The Walker, provides a neat, elegant, and effective alternative, a retractable leash designed to accommodate two dogs at once (FIG. 1). Simply stated, The Walker is a retractable leash system with which two, and in other embodiments (FIGS. 14 and 15), three or more dogs could be walked from a single, handheld unit. In overall appearance, The Walker is a single unit composed of two roughly symmetrical halves [1,2], configured in an hourglass shape and formed in a tough and durable, injection-molded thermoplastic (FIG. 1, 2A, 3). The upper component [1] is surmounted with an arcuate, ergonomically contoured and textured rubber handgrip [3] or handle FIG. 5A, 5B, 9A), and features a sliding control release and locking lever [4] (FIG. 9B) to be manipulated by the thumb to allow the leash or leashes to be unreeled or locked in place. At the other end of the handle, a separate control-button operates a battery-powered light-emitting diode light [5](FIG. 9A), this light placed below the upper arc of the handle and oriented to shine toward the ground. The light provides either continual illumination or repeated flashing illumination, depending on the sequence with which the user presses the control button. Now within this upper handled component is a master leash [6] (FIG. 7,), a thin, nylon cord or the like, which moves through the interior locking/release mechanism [7] (FIG. 7,), around a spring-loaded reel [8] (FIG. 7,), then down through an aperture [9] at the bottom of the unit. This outlet aperture is surrounded with a circular metal supporting lip, which mates with a matching perforated disk at the top of the lower component. The master leash thus connects the upper and lower components of the device (FIG. 7A), and the upper and lower units rotate independently of one another, in a swiveling motion centered on the two opposed supporting lips or washers [10](FIG. 1B). The swiveling motion is achieved with a ball bearing swivel mechanism [11] (FIGS. 7A and 7B), and through an opening in the top of the lower portion and wherein the leash thus connects the upper and lower components of the device, and the upper and lower portions are permitted to rotate independently of one another, in a swiveling motion centered on two opposed supporting lips or washers which are mounted above and below a top and bottom race, which along with a cage, contains the ball bearings. Within the upper portion of the lower unit, the central master leash terminates in a flat-bottomed, semicircular disc fitted with three predrilled holes [12]. The hole at the top receives the vertically descending master leash which is knotted here permanently, and a similar hole at the bottom ends of the semicircular disc receive, and anchor by means of knots, two additional leashes which descend from the disc on opposite diagonals (FIG. 7A,). These are the working, retractable dog-leashes [13] as shown in FIGS. 7A, 7B, and 8, each of which coils and uncoils off a dedicated, spring-loaded reel or pulley within the lower portion of the unit, then exit the device at each side of the bottom of the unit, which describes a similar though opposite arc from that of the handle (FIG. 8). Each of the two leashes is fitted at its terminus with a standard, swiveling snap-shackle [14] for attachment to and detachment from the dogs' collars.

Other embodiments of The Walker include a single leash (FIG. 10), equipped with the walking light [15] and another one with a third retractable leash descending from the bottom center of the device, midway between the two that have been described above.

Figure 11:
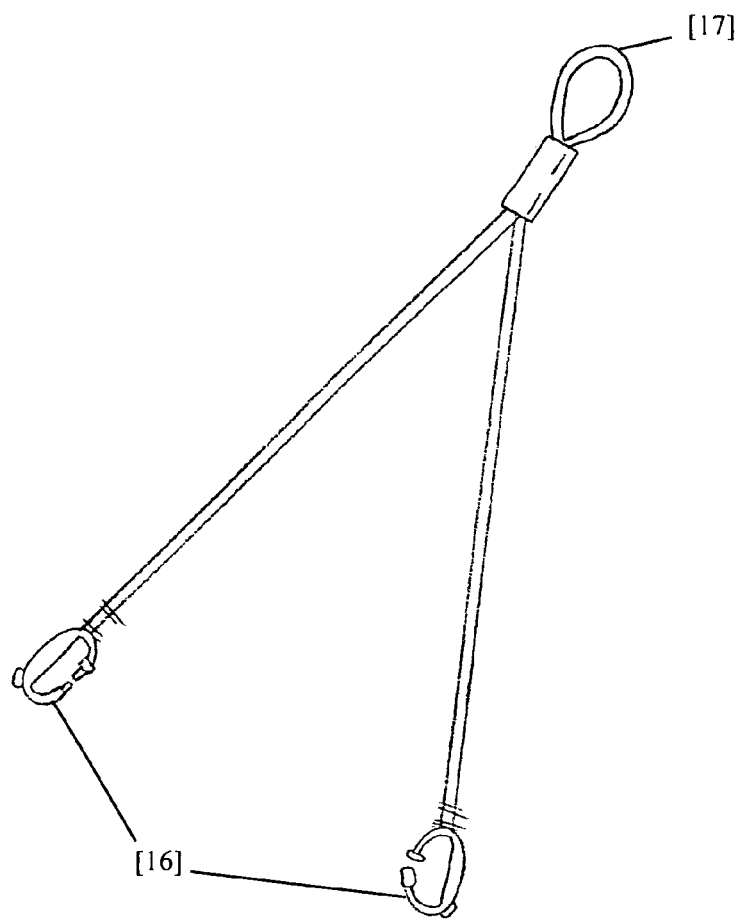
FIG. 11 is a front perspective view of an extended leash for two pets which can be attached to the lower segment of the lower portion of the pet walking device of the present invention.
Figure 14:
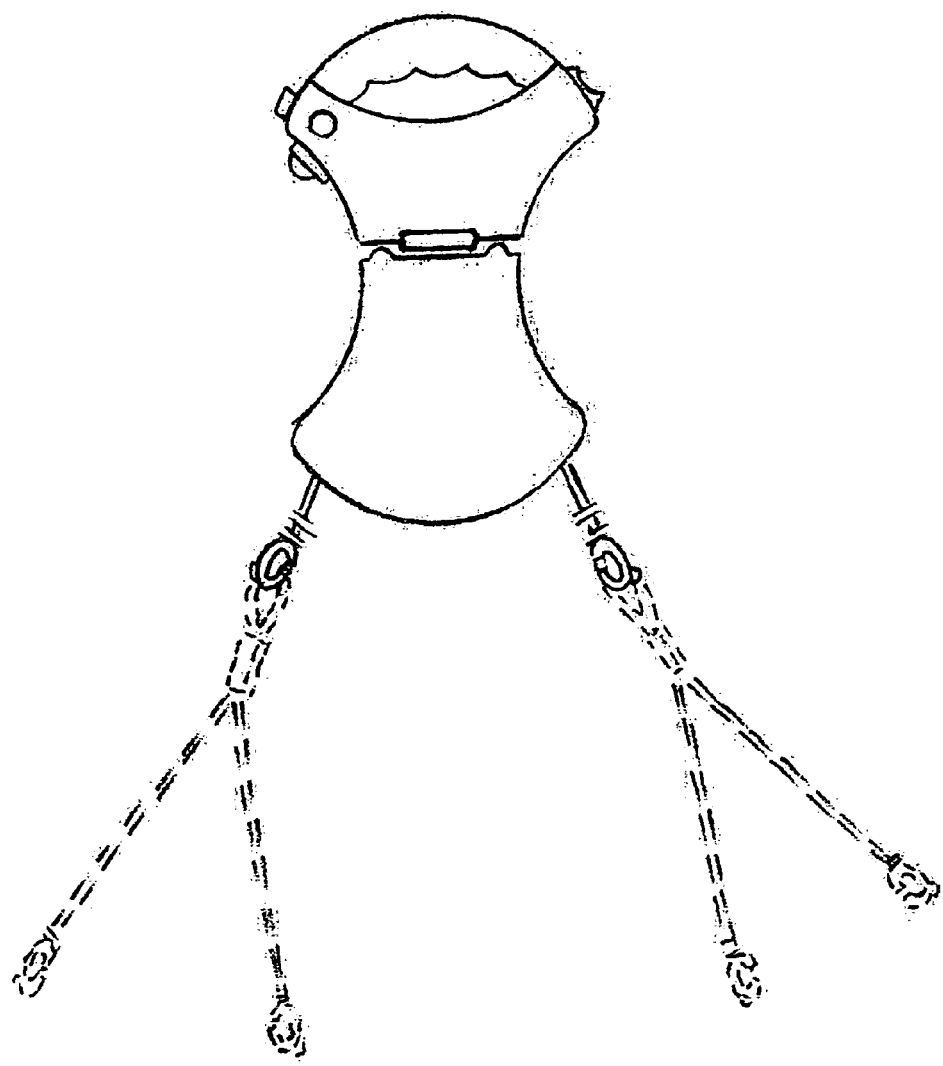
FIG. 14 shows a front perspective view of the pet walking device of the present invention showing an extended leash for two pets attached to each of the lower segments of the lower portions to allow capability of walking four pets.

Further, shown in FIG. 11, is another embodiment that may be attached to the clasp [14] shown in figure out, allowing the user to walk up to four animals, as shown in FIG. 14. This device comprises a cord with clips [16] on each end and looped in the middle. The looped end [17] attaches to the clasp of The Walker.

Figure 12:
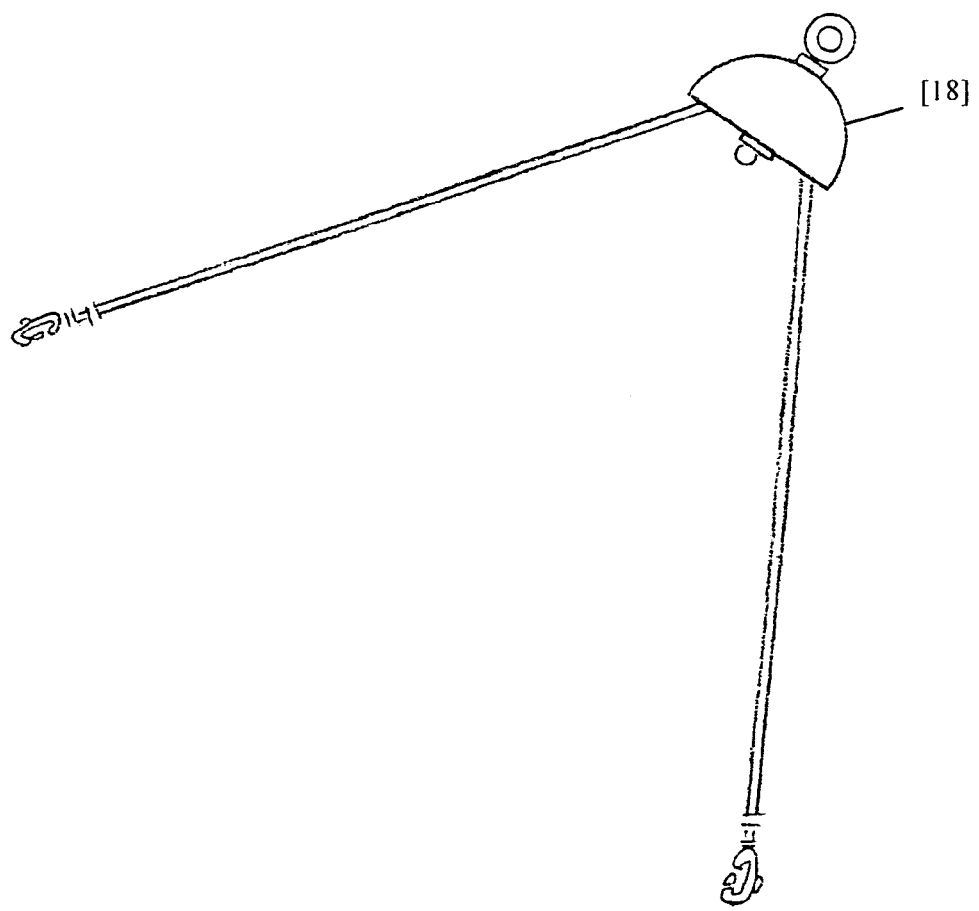
FIG. 12 shows a front view of an alternative embodiment of the extended leash attachment for walking multiple pets.
Figure 13:
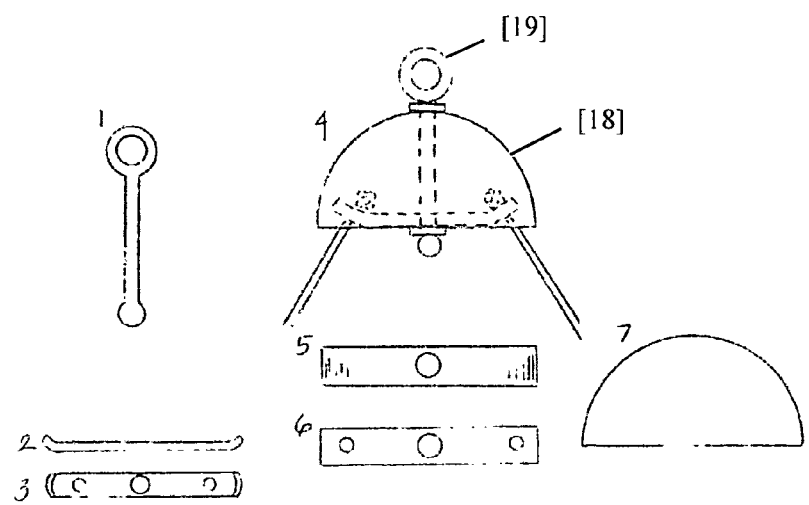
FIG. 13 shows a front cutaway view of the alternative embodiment extended leash attachment showing internal mechanism with components.

In yet another embodiment, shown in FIGS. 12 and 13 uses a toggle [18] semicircular in shape that houses ends of two ropes that form leashes with clasps for attachment to dog collar at the opposite ends. At the top of the arc of the toggle a circular ring [19] protrudes exit's the semicircular toggle housing [18] and serves as an attachment point for the clasps [14] of the walker. One or two semicircular toggles may be attached to The Walker allowing up to four animals to be attached simultaneously.

The Walker, a unique and well-designed handheld retractable leash for walking one or more dogs, presents dog-owners and walkers with an extraordinarily useful device, one unlike any currently on the market. First, unlike the many retractable dog leashes currently on the market, The Walker accommodates two or more dogs on the same handheld unit and with its unique, two-part, 360-degree swiveling design, The Walker prevents the animals' leashes from becoming twisted and tangled together. Offering all the benefits that dog-owners expect from retractable leashes, The Walker not only accommodates two dogs, but would also provide a built-in flashlight for walking at night, or in fog or other low-visibility conditions. This light is set to provide constant illumination, or to provide a light which flashes at regular intervals which is highly useful along roads, streets, and sidewalks, as a beacon to alert motorists and bicyclists to one's presence. Made with a comfortable, cushioned, ergonomically shaped handle to ease hand and wrist strain, The Walker is easy to handle, easy to control, and a pleasure to use. With its numerous embodiments, the Walker is not merely a discrete and useful product, but indeed a product line.

The device of the present invention comprises an essentially four sided configuration. The upper side and lower side are described by convex circular arcs and the two sides are described by concave circular arcs. The device is bifurcated and attached at the center with a ball bearing swivel device.

FIG. 1A is an elevational angled perspective view of the device of the present invention.

FIG. 1B is an elevational angled perspective view of the device of the present invention showing the distal portion rotated ninety-degrees from the handle portion.

Figure 1C:
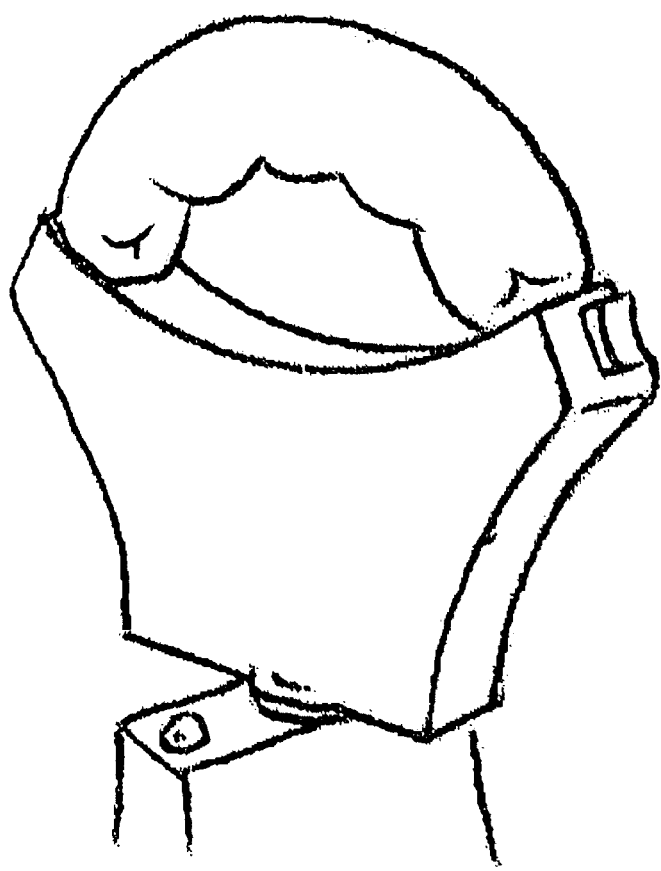
FIG. 1C is a close-up right angled perspective view of a portion of the device of the present invention.

FIG. 1C is a close-up right angled perspective view of a portion of the device of the present invention.

Figure 2A:
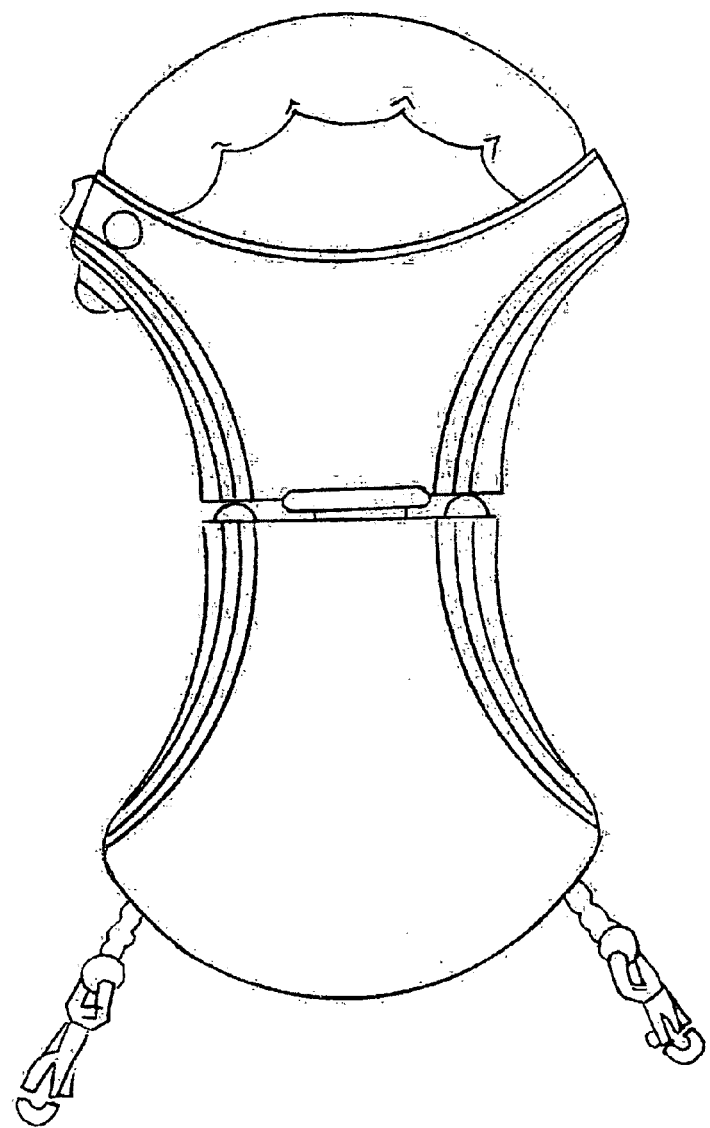
FIG. 2A is a front perspective view of the pet walking device of the present invention designed for small to medium sized pets showing various novel features.

FIG. 2A is a front perspective view of a diagram of the pet walking device of the present invention designed for small to medium sized pets showing various novel features. This view shows the sliding control release and locking lever which is attached to the outside edge of the upper side edge of the upper portion of the device. Near the sliding control release and locking lever is a push button control for control of the illumination device positioned on the front of the upper portion of the device. There is a similar button on the rear side of the device to accommodate both right handed and left handed individuals as shown in FIG. 10C. This applies to both The Walker and The Walker mini (FIG. 19A). On the bottom edge of the side of the upper portion of the device is the illumination device which comprises a batter powered LED. This light is placed below the upper arc of the handle and oriented to shine toward the ground when the device is in use.

This view also shows the ergonomically contoured and textured soft rubber hand grip or handle. From the bottom of the device extends at least one heavy duty thin durable 2 ply nylon cord with a leash attachment for attaching to the collar of a pet. Also, between the end of the nylon cord and the leash attachment is placed a small rubber ball which acts as a stopper to prevent over-retraction of the cord.

Figure 2B:
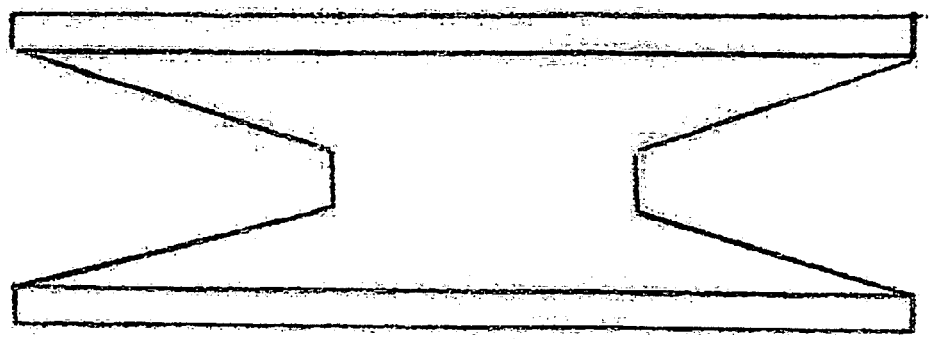
FIG. 2B is a side diagrammatic view of the pulley for the pet walking device of the present invention designed for small to medium sized pets.

FIG. 2B is a side diagrammatic view of the pulley for the pet walking device of the present invention designed for small to medium sized pets.

Figure 3:
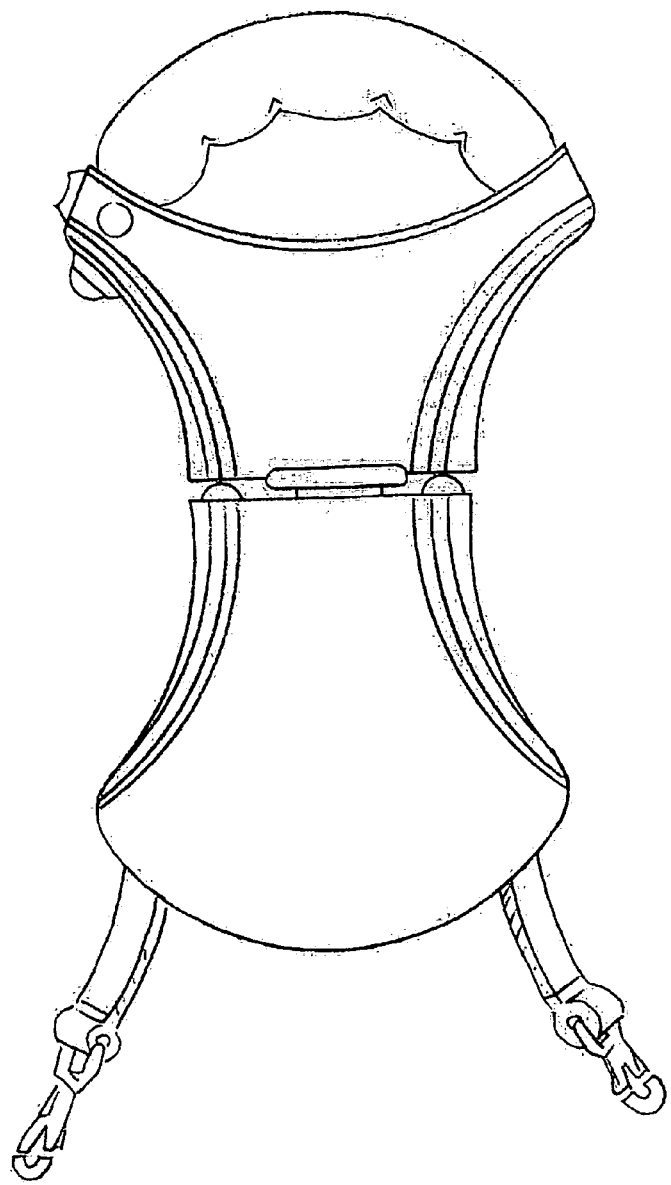
FIG. 3 is a front perspective view of the pet walking device of the present invention designed for medium to large sized pets showing heavy wide webbing for the leash element.

FIG. 3 is a front perspective view of the pet walking device of the present invention designed for medium to large sized pets showing heavy wide webbing for the leash element. One difference between this version and that shown in FIG. 5 is the placement of a rubber fitting which is placed between the end of the heavy wide webbing and the leash attachment wherein the rubber fitting acts as a stopper to prevent over-retraction of the cord.

Figure 4A:
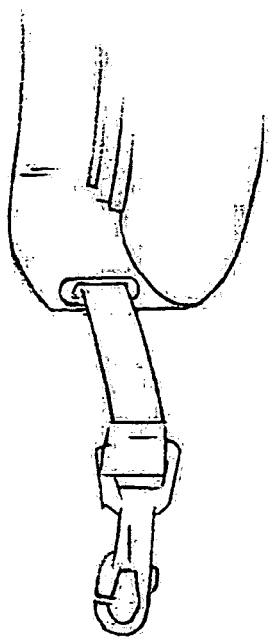
FIG. 4A is a partial side perspective view of the lower portion of the pet walking device of the present invention designed for medium to large sized pets showing the outlet for the heavy wide webbing for the leash element.

FIG. 4A is a partial side perspective view of the lower portion of the pet walking device of the present invention designed for medium to large sized pets showing the outlet for the heavy wide webbing for the leash element.

Figure 4B:
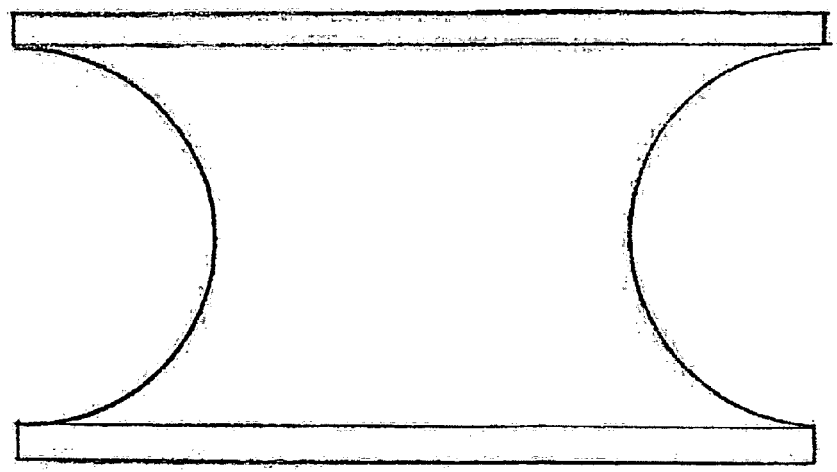
FIG. 4B is a side diagrammatic view of the pulley for the pet walking device of the present invention designed for medium to large sized pets.

FIG. 4B is a side diagrammatic view of the pulley for the pet walking device of the present invention designed for medium to large sized pets.

Figure 5A:
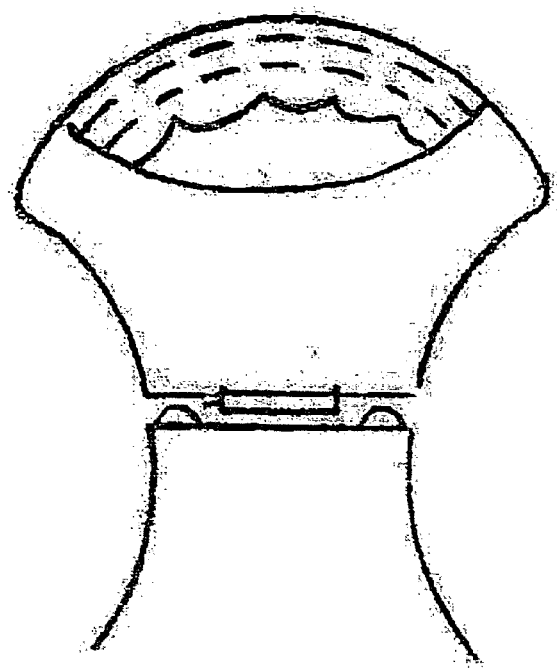
FIG. 5A is a close-up view of the handle portion of the pet walking device of the present invention having full rubber grip.

FIG. 5A is a close-up view of the handle portion of the pet walking device of the present invention having full rubber grip.

Figure 5B:
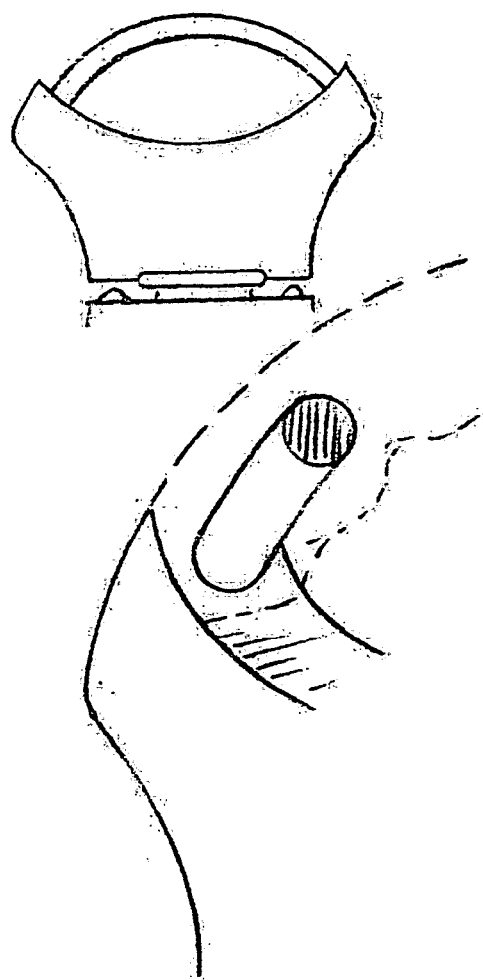
FIG. 5B is a close-up view of the handle portion of the pet walking device of the present invention showing rubber handle grip attachment covering the base handle grip.

FIG. 5B is a close-up view of the handle portion of the pet walking device of the present invention showing rubber handle grip attachment covering the base handle grip. This view shows the underlying plastic support of the hand grip without the rubber grip. This view also shows how the rubber grip fits over the underlying plastic support.

Figure 6:
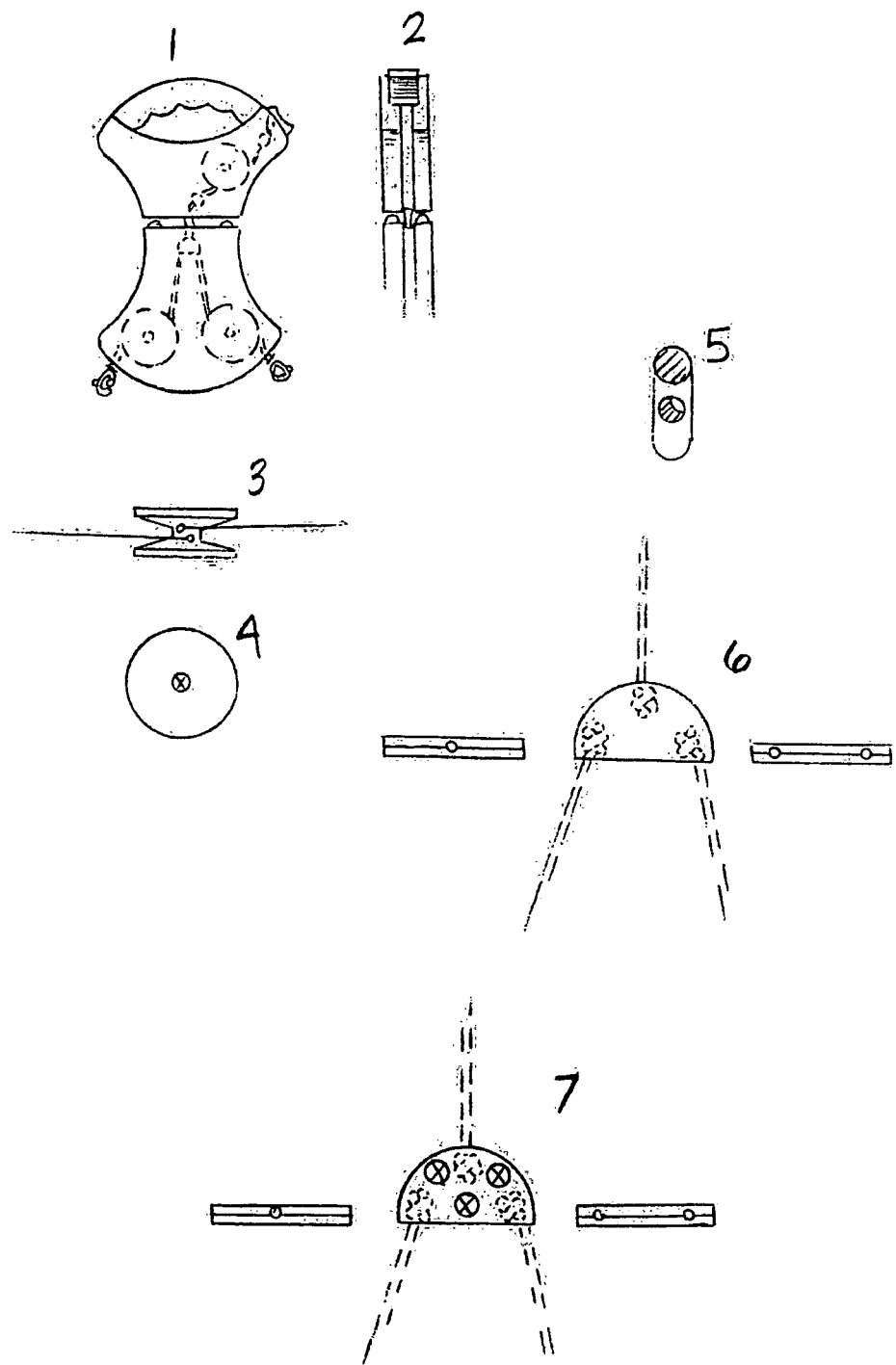
FIG. 6 is a front cutaway view of the pet walking device of the present invention showing internal elements.

FIG. 6 is a front cutaway view of the pet walking device of the present invention showing internal elements. This view shows the control lever having an up and down motion to allow the leash to extend or to lock it in place (Reference No. 1-2). This view also shows the leash feeding through stationary support columns(3,4). After the leash feeds through the stationary support columns it traverses the interior of the device and onto the side of the semicircular component which serves to separate and feed the leash to the feed pulley for extraction of the leash 6). The feed pulley shown in this figure is designed for use with the small to medium pet sized device. Reference No. 7 is a cut away view of the semicircular component and the travel of the leash along its arcuate circumference.

FIG. 7A is a cut away view of the upper segment of the lower portion and the lower segment of the upper portion showing internal elements of the swivel mechanism of the pet walking device of the present invention, wherein the upper segment of the lower portion show internal elements of the swivel mechanism of the pet walking device of the present invention. The swivel mechanism comprises a metal lip support at the bottom of the upper portion of the device. The leash (1) travels from the pulley (2) in the upper portion of the device through a guide (3) and on through a hole in the metal lip support. The leash then travels through a plastic lip extension having ball bearings which travel in a circular race (4) and extends through the top of the bottom portion of the device and onto the semicircular component and down the lower portion of the device through the outlet hole. The upper surface of the lower portion comprises a notch or bump at its periphery that protrudes from the surface to allow more support and stability within the cavity of the two components, thus allowing for smooth swivel motion. The semicircular component provides for stronger support and also eases the tension on the leash clamp when the leash is fully extended. This clamp applies to all embodiments of the invention.

FIG. 7B is a front cutaway view of the upper segment of the lower portion and the lower segment of the upper portion of the modified version of the pet walking device of the present invention showing the mechanism of the heavy duty swivel device. The swivel motion is made possible by the motion of the ball bearings traveling in a race wherein the ball bearings are held in the race by a washer.

Figure 8A:
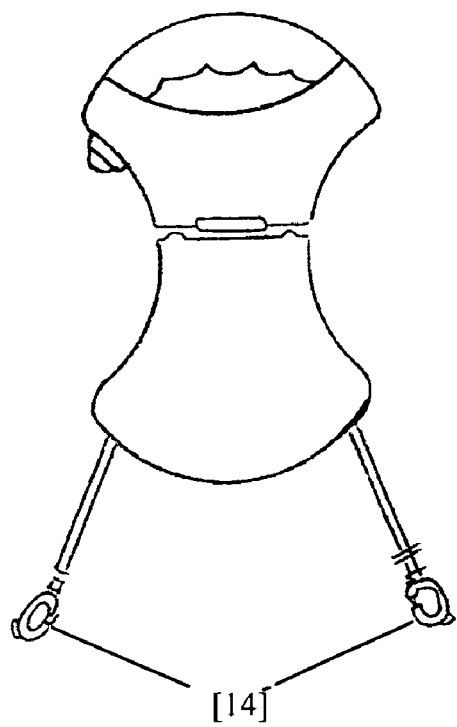
FIG. 8A is a front diagrammatic view of the pet walking device of the present invention showing attachment points for the front portions to be attached to the back portions of the device.

FIG. 8A is a front diagrammatic view of the pet walking device of the present invention showing attachment points for the front portions to be attached to the back portions of the device.

Figure 8B:
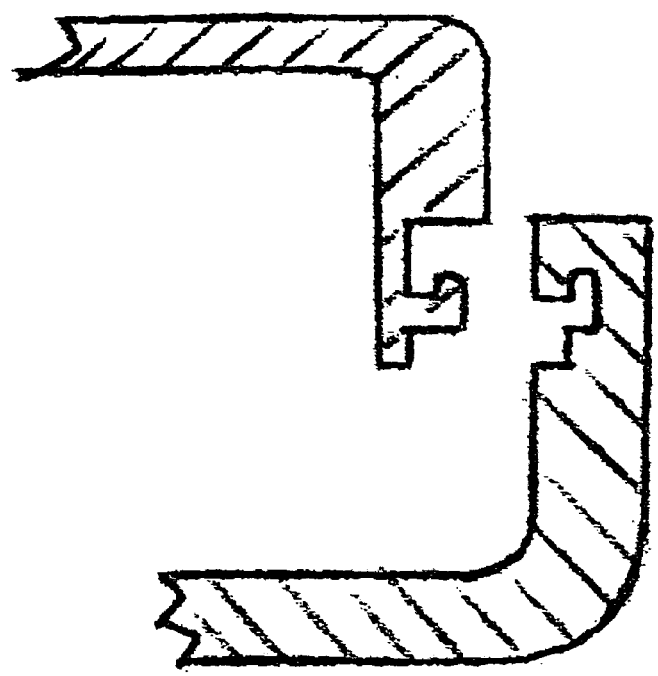
FIG. 8B is a cutaway close up of the attachment mechanism for attachment points for the front portions to be attached to the back portions of the device.

FIG. 8B is a close up of the attachment mechanism for attachment points for the front portions to be attached to the back portions of the device. It is envisioned that the upper and lower components of the device are manufactured by injection molding or other extruded process and produced with front and back components that are snapped or otherwise fastened together, thus housing the internal components of the device.

Figure 9A:
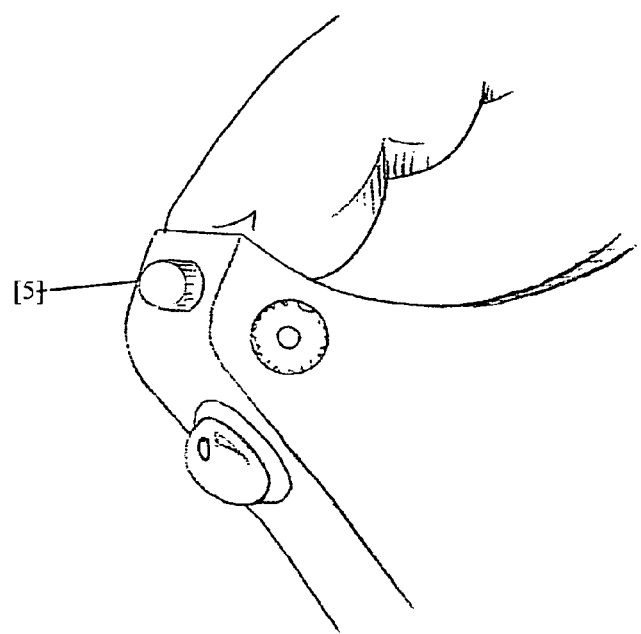
FIG. 9A is a close-up corner view of the handle portion of the pet walking device of the present invention showing the light, push button mechanism, and leash lever.

FIG. 9A is a close-up corner view of the handle portion of the pet walking device of the present invention showing the light, and push button mechanism and leash lever control. The operation of the push button is as follows: push the button once to turn on the light. Push the button twice, and the light flashes in a repeating flashing mode. Push the button three times, and the light turns off.

Figure 9B:
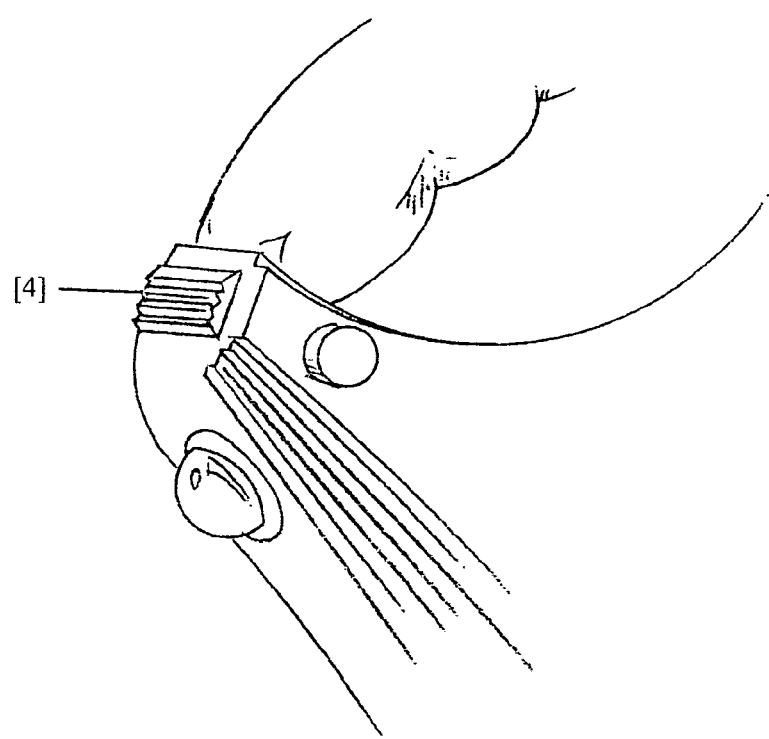
FIG. 9B shows is a close-up corner view of the handle portion of the pet walking device of the present invention showing the light, and leash lever control mechanism of the modified version.

FIG. 9b shows is a close-up corner view of the handle portion of the pet walking device of the present invention showing the light, and leash lever control mechanism of the modified version.

Figure 15:
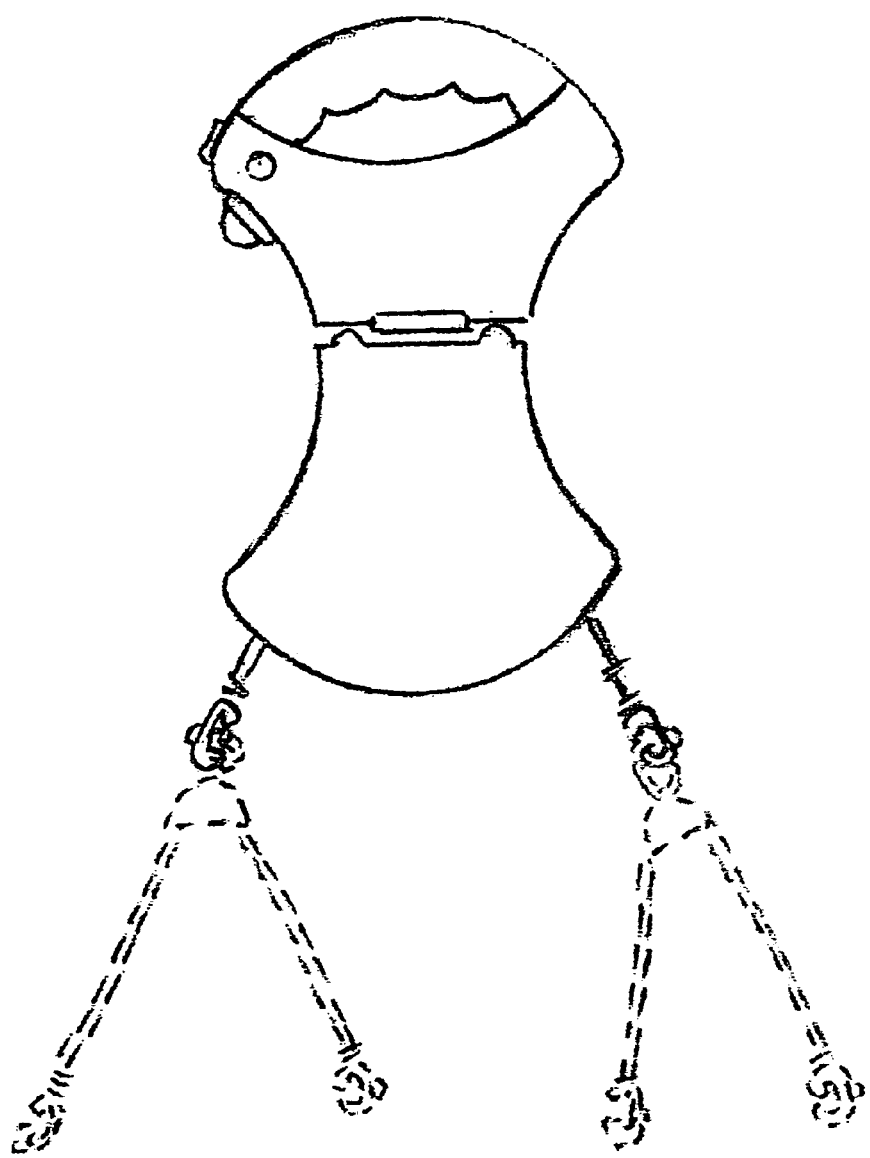
FIG. 15 shows a front view of the pet walking device of the present invention showing two alternative embodiment extended leash attachments for walking four pets.
Figure 16:
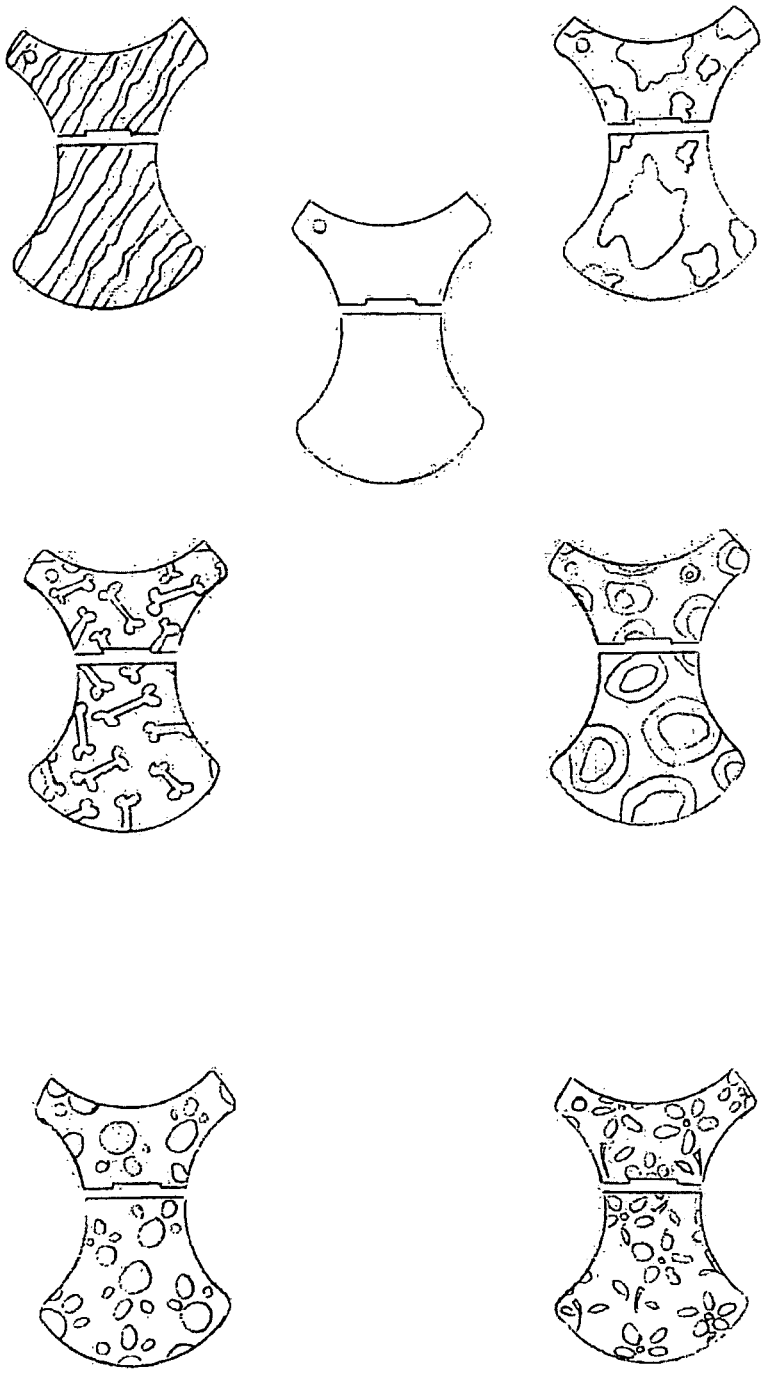
FIG. 16 shows multiple versions for designs for imprinting on the outer casing the pet walking device of the present invention, along with a plastic case.

FIG. 15 is a front perspective view of an alternative embodiment of the present invention designed for use with a single pet and a single leash. This version can be produced in the small to medium sized version or in the medium to large sized version.

FIG. 17 shows multiple versions for designs for imprinting on the outer casing the pet walking device of the present invention, along with a plastic case.

Figure 10A:
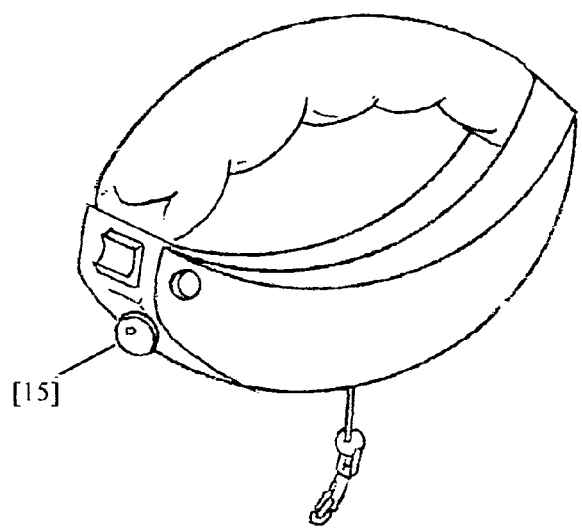
FIG. 10A shows a side perspective view of the pet walking device of the present invention designed for walking a single pet showing the leash lever control mechanism and light and push button control.

FIG. 10A shows a side perspective view of the pet walking device of the present invention designed for walking a single pet showing the leash lever control mechanism and light and push button control.

Figure 10B:
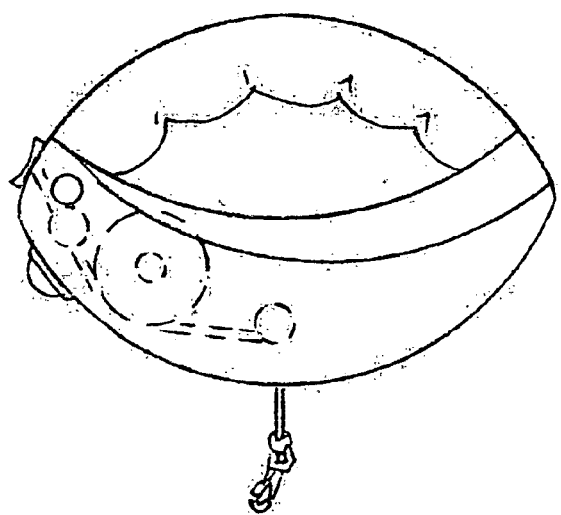
FIG. 10B shows a front view of the pet walking device of the present invention designed for walking a single pet showing the internal mechanism in phantom.
Figure 10C:
FIG. 10C is a side view of the pet walking device of the present invention designed for walking a single pet showing the leash lever control mechanism and light and push button control.

FIG. 10B shows a front view of the pet walking device of the present invention designed for walking a single pet showing the internal mechanism in phantom.

FIG. 10C is a side view of the pet walking device of the present invention designed for walking a single pet showing the leash lever control mechanism and light. A push button control lever for the light is attached to the same end of the device at both sides of the same end for ease of use for left handed or right handed individuals.

Figure 10D:
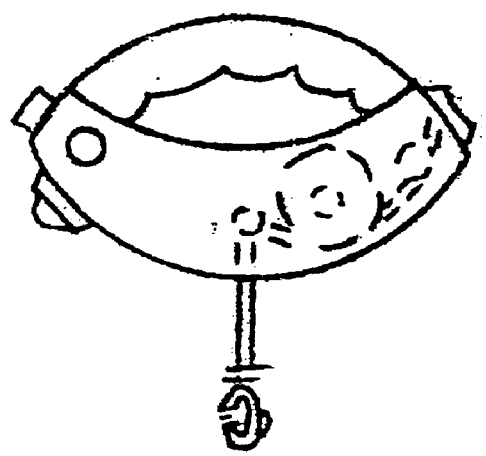
FIG. 10D is a front perspective view of an alternative embodiment of the present invention designed for use with a single pet shown in phantom.

FIG. 10D is a close up side perspective view of the pet walking device of the present invention designed for walking a single pet showing the handle with embossed groove.

FIG. 11 is a front perspective view of an extended leash for two pets which can be attached to the lower segment of the lower portion of the pet walking device of the present invention. The loop that attaches the extension to the leash attachment means on the device can be any appropriate diameter, but approximately one-half inch is contemplated.

FIG. 12 shows a front view of an alternative embodiment of the extended leash attachment for walking multiple pets.

FIG. 13 shows a front cutaway view of the alternative embodiment extended leash attachment showing internal mechanism with components including a second semicircular component to prevent entanglement of the two leashes extending from the device.

FIG. 14 shows a front perspective view of the pet walking device of the present invention showing an extended leash for two pets attached to each of the lower segments of the lower portions to allow capability of walking four pets.

FIG. 15 shows a front view of the pet walking device of the present invention showing two alternative embodiment extended leash attachments for walking four pets.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A device comprising a retractable leash system with which one or more pets can be walked from a single, handheld unit, wherein the device comprises an essentially four sided configuration wherein the upper side and lower side are described by convex circular arcs and the two sides are described by concave circular arcs and wherein the device is bifurcated to form an upper portion and a lower portion wherein the upper portion and lower portion are attached at their centers with a swivel device, further having at least one leash outlet at the bottom of the lower portion. and further a leash coiled in the upper portion, said leash which moves through the interior locking and release mechanism, around a spring loaded reel, then down through an outlet aperture at the bottom of the upper portion, wherein the outlet aperture is surrounded with a circular metal supporting lip, which mates with a matching perforated disk at the top of the lower portion, through an opening in the said swivel device, the said swivel device being defined as ball bearing swivel mechanism, and through an opening in the top of the lower portion and wherein the leash thus connects the upper and lower components of the device, and the upper and lower portions are permitted to rotate independently of one another, in a swiveling motion centered on two opposed supporting lips or washers which are mounted above and below a top and bottom race which, along with a cage, contains the ball bearings.

2. The device of claim 1 wherein the upper segment of the lower portion, the leash terminates in a flat-bottomed, semi-circular component fitted with three predrilled holes, wherein a hole in the center located near the top of the semi-circular component receives the vertically descending leash which leash is knotted here permanently, and a similar hole near the bottom corners of the semicircular component receive, and anchor by means of knots, two additional leashes which descend from edges of the arcuate perimeter of the semicircular component.

3. The device according to claim 1 in which the leash is made from small to medium weight nylon or fabric cord so as to be suitable for walking one or more small to medium sized pets.

4. The device according to claim 1 in which the leash is made from medium to heavy weight nylon, 2-ply nylon cord, nylon webbing or similar strength fabric cord so as to be suitable for walking one or more medium to large sized pets.

5. The device according to claim 1 in which a light is included in the upper portion either on the same side or opposite side from a lock and release mechanism switch.

6. The invention claimed is a leash according to claim 1, further comprising a cord with clasps on each having a loop in the middle allowing attachment of each of the clasps to the collar of an animal.

7. The invention claimed is a leash according to claim 1 further comprising a semicircular toggle at one end, the toggle housing ends of two cords each forming a leash with a clasp at each other end for attachment to the collar of an animal, further the toggle is fitted with a ring at the top of it's arc that may be attached to yet another leash device.

* * * * *